US012498460B2

(12) United States Patent
Shi

(10) Patent No.: US 12,498,460 B2
(45) Date of Patent: Dec. 16, 2025

(54) FREQUENCY MODULATION CONTINUOUS WAVE LIDAR DEVICE

(71) Applicant: National Central University, Taoyuan (TW)

(72) Inventor: Jin-Wei Shi, Taoyuan (TW)

(73) Assignee: National Central University, Taoyuan (TW)

( * ) Notice: Subject to any disclaimer, the term of this patent is extended or adjusted under 35 U.S.C. 154(b) by 999 days.

(21) Appl. No.: 17/582,111

(22) Filed: Jan. 24, 2022

(65) Prior Publication Data

US 2023/0204726 A1 Jun. 29, 2023

(30) Foreign Application Priority Data

Dec. 24, 2021 (TW) .................. 110148793

(51) Int. Cl.
*G01S 7/481* (2006.01)
*G01S 17/06* (2006.01)
(Continued)

(52) U.S. Cl.
CPC ............ *G01S 7/4814* (2013.01); *G01S 17/06* (2013.01); *G01S 17/50* (2013.01); *G02B 26/10* (2013.01);
(Continued)

(58) Field of Classification Search
CPC ........ G01S 7/4814; G01S 17/06; G01S 17/50; G01S 7/4816; G01S 7/4817; G01S 7/499; G01S 17/32; G01S 17/58; G01S 17/89; G02B 26/10; G02B 27/30; H01S 3/06716; H01S 3/06754; H01S 3/1608;
(Continued)

(56) References Cited

U.S. PATENT DOCUMENTS 9,590,390 B1 * 3/2017 Tatah .................. G11B 5/314
11,837,838 B1 * 12/2023 Morrison ............ H01S 5/1014
(Continued)

OTHER PUBLICATIONS

Y. Deng, H. Gao, B. Li, J. Zhang and Z. Zhou, "All-Optical Temporal Differentiator Based on a Gain-Saturated DFB-SOA," 2018 Asia Communications and Photonics Conference (ACP), Hangzhou, China, 2018, pp. 1-3, doi: 10.1109/ACP.2018.8596 (Year: 2018).*

*Primary Examiner* — Isam A Alsomiri
*Assistant Examiner* — Joseph C Fritchman
(74) *Attorney, Agent, or Firm* — Demian K. Jackson; Jackson IPG PLLC

(57) ABSTRACT

A lidar device, comprising a laser generator and a lidar unit, is provided and operated with frequency modulation continuous wave. The laser generator comprises an amplifier unit; and a reflector unit connected with at least one end of the amplifier unit. The amplifier unit comprises at least one first luminous gain area and at least one second luminous gain area. The first luminous gain area is operated in a saturated region with a first current source applied. The second luminous gain area is operated in a linear region with a second current source applied. Thus, a laser is generated and outputted to the lidar unit. The laser generator is operated with the luminous gain areas of the amplifier unit pushed into the saturated region to suppress intensity modulation and fix power. Even if current changes, frequency drifts only with continuity and adjustability achieved and no mode hop happened.

11 Claims, 4 Drawing Sheets

(51) Int. Cl.

| | |
|---|---|
| *G01S 17/50* | (2006.01) |
| *G02B 26/10* | (2006.01) |
| *H01S 3/067* | (2006.01) |
| *H01S 3/16* | (2006.01) |
| *H01S 5/065* | (2006.01) |
| *H01S 5/125* | (2006.01) |
| *H01S 5/183* | (2006.01) |
| *G02B 27/30* | (2006.01) |

(52) U.S. Cl.
CPC ...... *H01S 3/06716* (2013.01); *H01S 3/06754* (2013.01); *H01S 3/1608* (2013.01); *H01S 5/0653* (2013.01); *H01S 5/125* (2013.01); *H01S 5/18361* (2013.01); *G02B 27/30* (2013.01)

(58) Field of Classification Search
CPC .... H01S 5/0653; H01S 5/125; H01S 5/18361; H01S 3/2375; H01S 5/06246; H01S 5/06258; H01S 5/183; H01S 5/5063; H01S 5/5072
See application file for complete search history.

(56) References Cited

U.S. PATENT DOCUMENTS

2009/0310630 A1* 12/2009 Takabayashi ....... H01S 5/04254
372/20
2011/0149381 A1* 6/2011 Hatakeyama ......... H01S 5/4068
359/341.1

* cited by examiner

FREQUENCY MODULATION CONTINUOUS WAVE LIDAR DEVICE

TECHNICAL FIELD OF THE INVENTION

The present invention relates to a lidar device; more particularly, to an operation of some luminous gain areas of an amplifier unit as being pushed into a saturated region to suppress intensity modulation and fix power, where, even if current changes, frequency drifts only with continuity and adjustability of wavelength obtained and no mode hop happened.

DESCRIPTION OF THE RELATED ARTS

Related conventional laser is a tunable laser, where, on both sides of a semiconductor optical amplifier (SOA), a structure of distributed Bragg reflector (DBR) is set. But, with the modulation positioned on the DBR end, the effect of modulation is very poor as found by actual measurement. On scanning the frequency, as laser wavelength is drifting, the problem of mode hop appears. Besides, the operation is very complicated, where forward current and backward current are used; relative current needs to be adjusted; and its modal changes the wavelength in a jump. As a result, the stability of the laser modal decreases with noise increased. Hence, the prior art does not fulfill all users' requests on actual use.

SUMMARY OF THE INVENTION

The main purpose of the present invention is to provide a relatively simple operation of a laser generator pushing some luminous gain areas of an amplifier unit into a saturated region to suppress intensity modulation and fix power, where, even if current changes, frequency drifts only with continuity and adjustability of wavelength obtained and no mode hop happened.

To achieve the above purposes, the present invention is a lidar device using frequency modulation continuous wave (FMCW), comprising a laser generator and a lidar unit, where the laser generator comprises an amplifier unit and a reflector unit connected with at least one end of the amplifier unit; the amplifier unit comprises at least one of a first luminous gain area and at least one of a second luminous gain area; the first luminous gain area is operated in a saturated region, the second luminous gain area is operated in a linear region; a laser is thus obtained with the first luminous gain area and the second luminous gain area and outputted; the laser generator is operated with the first luminous gain area pushed into the saturated region to suppress intensity modulation and fix power; and, when current changes, frequency drifts with continuity and adjustability of wavelength obtained and no mode hop happened; the lidar unit is connected with the laser generator; the laser generator uses the fixed-power feature of the saturated region of the first luminous gain area to adjust a laser supplied to the lidar unit; after the lidar unit receives the laser to be emitted to a target, a reflected light corresponding to the target is received; and, through calculation, an image is built to show the information of speed and position of the target through frequency differences. Accordingly, a novel lidar device using FMCW is obtained.

BRIEF DESCRIPTION OF THE DRAWINGS

The present invention will be better understood from the following detailed description of the preferred embodiments according to the present invention, taken in conjunction with the accompanying drawings, in which.

DESCRIPTION OF THE PREFERRED EMBODIMENT

The following description of the preferred embodiments are provided to understand the features and the structures of the present invention.

Figure 1:
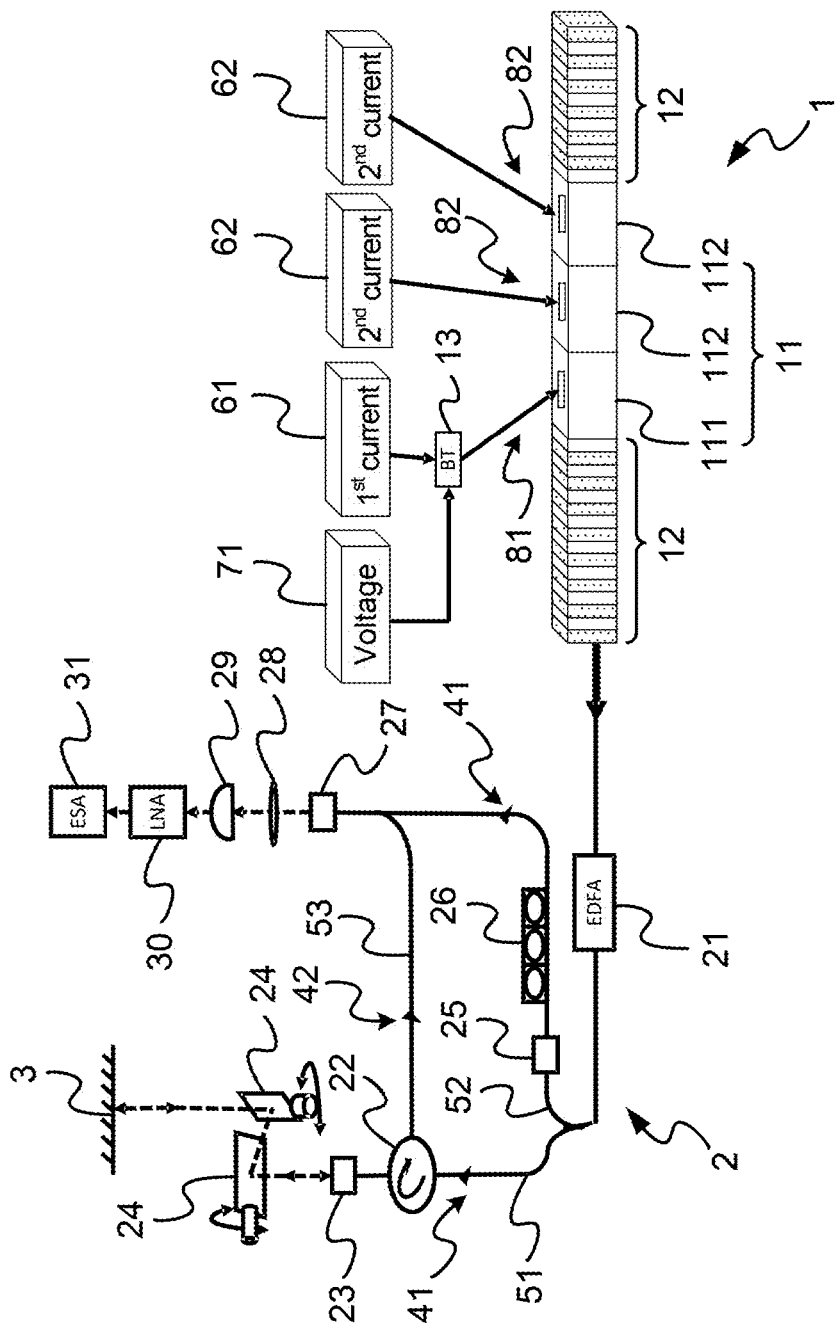
FIG. 1 is the view showing the first preferred embodiment according to the present invention.

Please refer to FIG. 1 to FIG. 4, which are a view showing a first preferred embodiment according to the present invention; a view showing an experimental result of the first preferred embodiment; a view showing a second preferred embodiment; and a view showing a third preferred embodiment. As shown in the figures, the present invention is a lidar device using frequency modulation continuous wave (FMCW). A first preferred embodiment is shown in FIG. 1, comprising a laser generator 1, and a lidar unit 2.

The laser generator 1 comprises an amplifier unit 11 and a reflector unit 12 connected with at least one end of the amplifier unit 11. The amplifier unit 11 comprises at least one of a first luminous gain area 111 and at least one of a second luminous gain area 112. The first luminous gain area 111 is operated in a saturated region 81 with the second luminous gain area 112 operated in a linear region 82 to generate a laser for outputting. Therein, the first and second luminous gain areas 111, 112 are semiconductor optical amplifiers (SOA). A plurality of the reflector units 12 in the laser generator 1 are connected to a first end and a second end of the amplifier unit 11; and the reflector unit 12 is a distributed Bragg reflector (DBR).

The lidar unit 2 is connected with the laser generator 1. The laser generator 1 uses the fixed-power feature of the saturated region 81 of the first luminous gain area 111 to adjust a laser 41 supplied to the lidar unit 2. After the lidar unit 2 receives the laser 41 to be emitted to a target 3, a reflected light 42 corresponding to the target 3 is received. Through calculation, an image is built to show the information of speed and position of the target 3 through frequency differences. Thus, a novel lidar device using FMCA is obtained.

The first luminous gain area 111 is operated in the saturated region 81 by being applied with a first current source 61; and the second luminous gain area 112 is operated in the linear region 82 by being applied with a second current source 62.

The first luminous gain area 111 or the second luminous gain area 112 is further coupled with a bias bypass (BT) 13 to receive a bias modulation voltage, where the bias modulation voltage comprises the first current source 61 and an alternative current (AC) driving voltage source 71; or the second current source 62 and an AC driving voltage source 71.

In the first preferred embodiment, a plurality of the reflector units 12 in the laser generator 1 are horizontally arranged on the first end and the second end of the amplifier unit 11 at left side and right side, where, as an example, the amplifier unit 11 comprises one of the first luminous gain area 111 and two of the second luminous gain areas 112. On using the first preferred embodiment, the first luminous gain area 111 is coupled with the bias bypass 13 to be operated in the saturated region; based on the first current source 61 and the AC driving voltage source 71 received by the bias bypass 13, the bias modulation voltage is outputted to the first luminous gain area 111 to control the first luminous gain area 111 to be operated in the saturated region 81 while the second luminous gain areas 112 are operated in the linear region 82 by being applied with the second current source 62; and, thus, the laser 41 is generated to be outputted to the lidar unit 2. The laser 41 is received by the lidar unit 2 to be divided into two paths at an output terminal of an erbium-doped fiber amplifier (EDFA) 21, and the two paths are a first optical path 51 and a second optical path 52. A splitting ratio of the first optical path 51 to the second optical path 52 is 90:10 with the part of the first optical path 51 being 90% and the part of the second optical path 52 being 10%. In the first optical path 51, the laser 41 is emitted parallelly to two rotating scan mirrors through a circulator 22 and a first collimator 23 and, then, starts scanning the target 3 to be reflected or scattered. After scanning the target 3 with reflecting or scattering occurred, the reflected light 42 of the target 3 is transmitted back through the circulator 22 along original path and, then, enters into a signal branch 53. In the second optical path 52, the laser 41 (with f1 frequency) is coupled with the reflected light 42 (with f2 frequency) on the signal branch 53 through a variable attenuator 25 and a polarization controller 26 and, then, enters into an avalanche photodiode (APD) 29 through a second collimator 27 and an aspheric lens 28. Frequency differences (=f1−f2) of coupled signals are thus detected by the APD as optical signals to be converted into electrical signals. After the electrical signals are processed by a low noise amplifier (LNA) 30 and an electronic spectrum analyzer (ESA) 31, an image is built to show the information of speed and position of the target 3 through the frequency differences.

Figure 2:
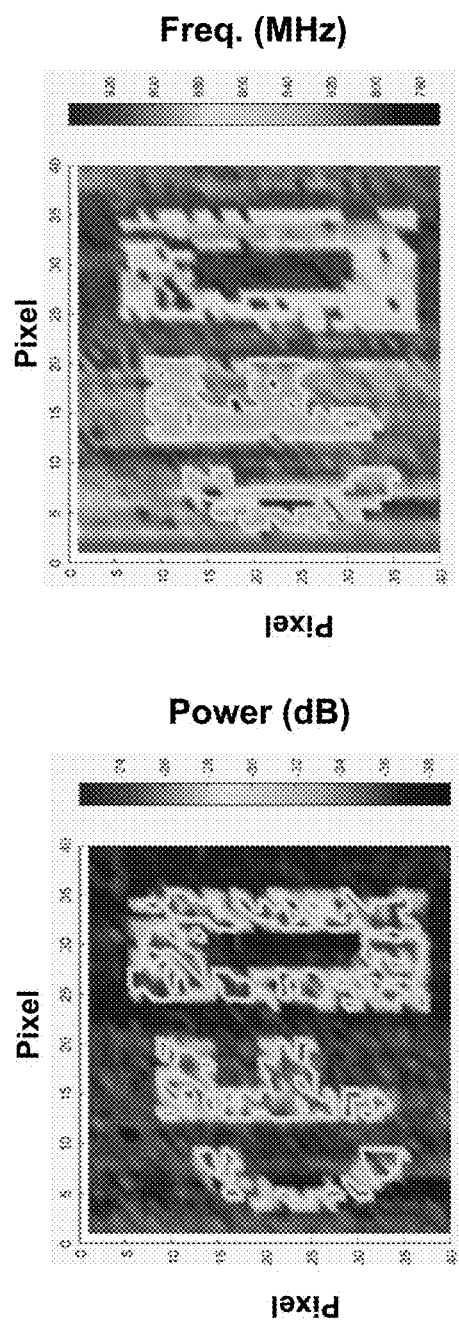
FIG. 2 is the view showing the experimental result of the first preferred embodiment.

An experimental result of the first preferred embodiment is shown in FIG. 2, where the frequency represents depth, the power represents intensity, and, thus, intensity and depth are measured. The experimental data shown in FIG. 2 verify that the present invention is applicable.

Hence, the present invention is relatively simple in operation, where a laser generator is operated with some luminous gain areas of an amplifier unit pushed into a saturated region to suppress intensity modulation for fixing power. Even if current changes, frequency drifts only with continuity and adjustability of wavelength obtained and no mode hop happened.

Figure 3:
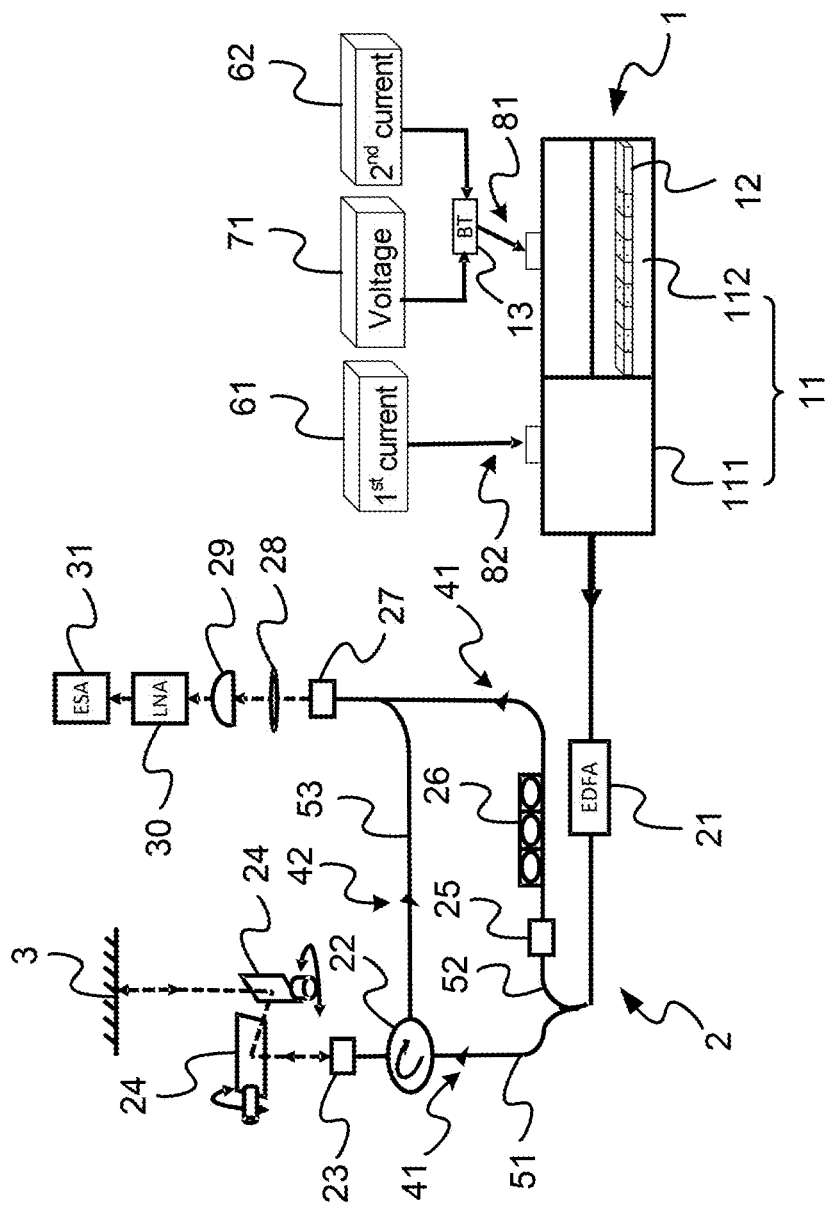
FIG. 3 is the view showing the second preferred embodiment.

In FIG. 3, a second preferred embodiment is shown. As compared with the first preferred embodiment, the second luminous gain area 112 of the amplifier unit 11 in the laser generator 1 is a distributed feedback (DFB) laser; the reflector unit 12 is built in the second luminous gain area 112 at a lower position; and the first luminous gain area 111 is integrated with the DFB laser. Besides, the second luminous gain area 112 is further coupled with a bias bypass 13 to receive a bias modulation voltage and the bias modulation voltage comprises the second current source 62 and the AC driving voltage source 71.

Figure 4:
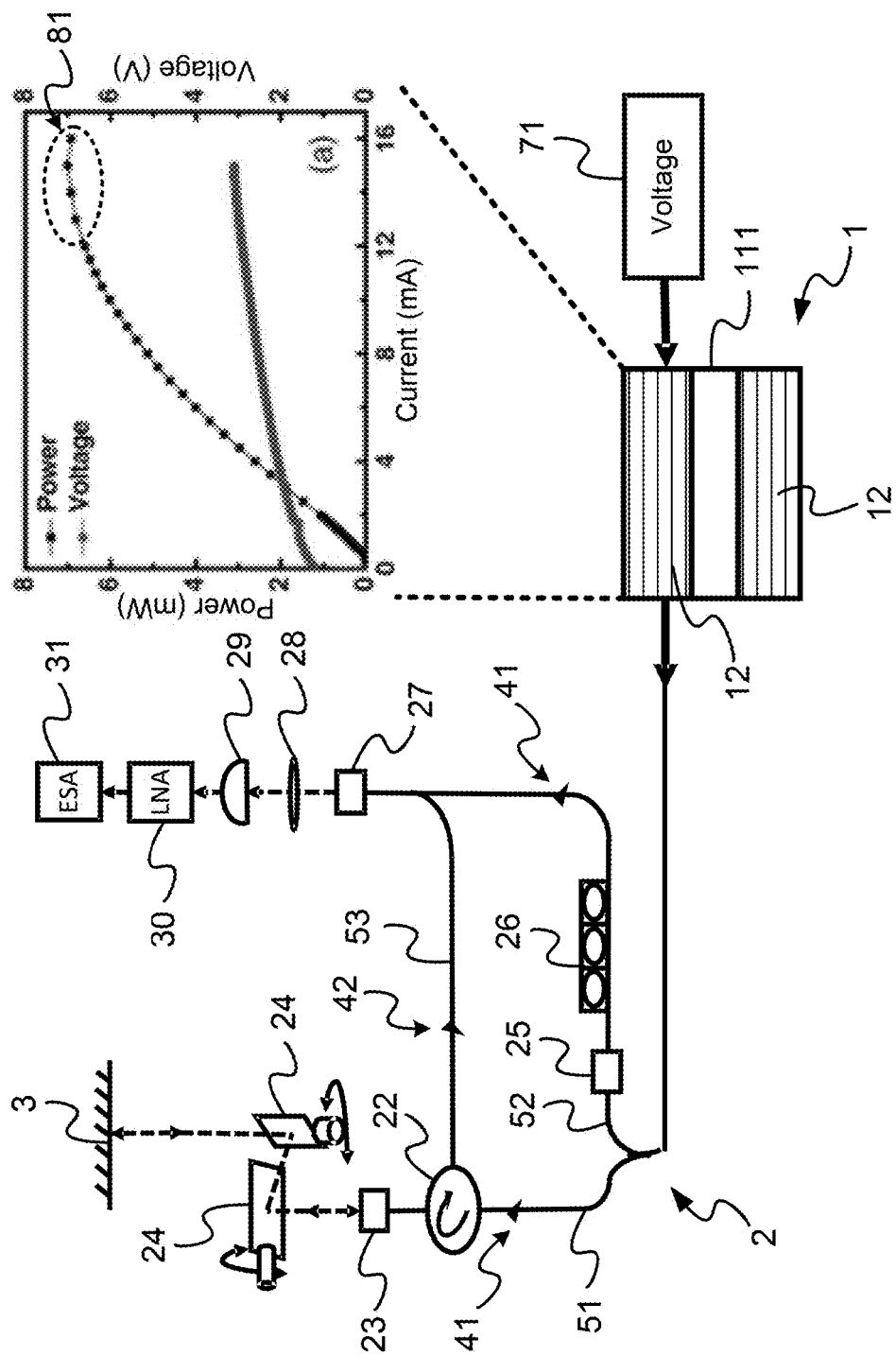
FIG. 4 is the view showing the third preferred embodiment.

In FIG. 4, a third preferred embodiment is shown. As compared with the first embodiment, the laser generator 1 is a single-mode vertical cavity surface emitting laser (VCSEL); and a plurality of the reflector units 12 are vertically arranged on an upper side and a lower side of the first luminous gain area 111.

To sum up, the present invention is a lidar device using FMCW, where a laser generator is operated with some luminous gain areas of an amplifier unit pushed into a saturation region to suppress intensity modulation and fix power; and, even if current changes, no intensity is modulized and frequency drifts only with continuity and adjustability of wavelength obtained and no mode hop happened.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A frequency modulation continuous wave lidar device comprising:
    a laser generator comprising an amplifier unit and a reflector unit connected with at least one end of said amplifier unit, said amplifier unit comprising a first luminous gain area operating in saturation and a second luminous gain area operating in linear operation and generating a laser beam and
    a lidar unit, connected with said laser generator, wherein said laser generator adjusts the laser beam emitted to the lidar unit to suppress intensity modulation, fix power, maintain a desired laser beam frequency and continuity of frequency drift with current changes, and inhibit mode-hopping and wherein the lidar unit emits the laser beam to a target, receives a reflected light corresponding to said target and, through calculation, generates an image to show information of speed and position of said target through frequency differences.

2. The lidar device according to claim 1, wherein said reflector unit is a distributed Bragg reflector (DBR).

3. The lidar device according to claim 1, wherein the laser generator includes a first current source inducing operation of the first luminous gain area in saturation and a second current source inducing operation of the second luminous gain area in linear operation.

4. The lidar device according to claim 3, further comprising a bias bypass to receive coupled to the first luminous gain area and receiving a bias modulation voltage comprising the first current source and an alternative current (AC) driving voltage source.

5. The lidar device according to claim 1, wherein a plurality of said reflector units in said laser generator are connected with a first end and a second end of said amplifier unit.

6. The lidar device according to claim 5, wherein a plurality of said reflector units in said laser generator are horizontally arranged on said first end and said second end of said amplifier unit at a left side and a right side of said amplifier unit.

7. The lidar device according to claim 1, wherein said laser generator is a single-mode vertical cavity surface emitting laser (VCSEL); and a plurality of said reflector units are vertically arranged on an upper side and a lower side of said at least one of said first luminous gain areas.

8. The lidar device according to claim 1, wherein said second luminous gain area of said amplifier unit in said laser generator is a distributed feedback (DFB) laser; said reflector unit is built in one of said second luminous gain area at a lower position; and said at least one of said first luminous gain areas are integrated with said DFB laser.

9. The lidar device according to claim 1, wherein said lidar unit receives the laser beam and divides the laser beam into a first optical path and a second optical path at an output terminal of an erbium-doped fiber amplifier (EDFA); wherein, in said first optical path, said divided laser beam is emitted parallelly to two rotating scan mirrors through a circulator and a first collimator to scan a target and wherein reflected light from the target is transmitted back through said circulator and, then, enters into a signal branch; and wherein the divided laser beam in said second optical path passes through a variable attenuator and a polarization controller and is then coupled with said reflected light on said signal branch and enters into an avalanche photodiode (APD) through a second collimator and an aspheric lens; wherein frequency differences of the coupled reflected light and of the divided laser beam of the second optical path signals are thus detected by said APD as optical signals and converted into electrical signals; and wherein, after said electrical signals are processed by a low noise amplifier (LNA) and an electronic spectrum analyzer (ESA), the image is produced showing the information of speed and position of said target through said frequency differences.

10. The lidar device according to claim 9, wherein a splitting ratio of said first optical path to said second optical path is 90:10 with the part of said first optical path being 90% and the part of said second optical path being 10%.

11. The lidar device according to claim 1, wherein said first and second luminous gain areas are semiconductor optical amplifiers (SOA).

\* \* \* \* \*